(12) United States Patent
Liu

(10) Patent No.: US 7,934,200 B2
(45) Date of Patent: Apr. 26, 2011

(54) ENHANCED SCENARIO TESTING OF AN APPLICATION UNDER TEST

(75) Inventor: Jeffrey Yu Kwan Liu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1648 days.

(21) Appl. No.: 11/185,478

(22) Filed: Jul. 20, 2005

(65) Prior Publication Data

US 2007/0022406 A1    Jan. 25, 2007

(51) Int. Cl.
*G06F 9/44* (2006.01)
*G06F 3/00* (2006.01)

(52) U.S. Cl. ........ 717/124; 717/125; 717/126; 715/700; 715/704

(58) Field of Classification Search ........................ None
See application file for complete search history.

(56) References Cited

U.S. PATENT DOCUMENTS

| | | | |
|---|---|---|---|
| 5,706,434 A * | 1/1998 | Kremen et al. | 709/218 |
| 6,067,639 A * | 5/2000 | Rodrigues et al. | 714/38 |
| 6,587,969 B1 * | 7/2003 | Weinberg et al. | 714/46 |
| 6,826,553 B1 | 11/2004 | DaCosta | |
| 6,978,218 B1 * | 12/2005 | Kolb et al. | 702/122 |
| 2002/0133807 A1 * | 9/2002 | Sluiman | 717/124 |
| 2003/0052917 A1 * | 3/2003 | Dubovsky | 345/764 |
| 2003/0056150 A1 * | 3/2003 | Dubovsky | 714/38 |
| 2003/0187668 A1 | 10/2003 | Ullmann et al. | |
| 2004/0034830 A1 | 2/2004 | Fuchs | |
| 2004/0107415 A1 * | 6/2004 | Melamed et al. | 717/124 |
| 2004/0111727 A1 | 6/2004 | Schwarzbauer et al. | |
| 2004/0179035 A1 | 9/2004 | Ullmann et al. | |
| 2004/0205772 A1 | 10/2004 | Uszok et al. | |
| 2005/0060719 A1 * | 3/2005 | Gray et al. | 719/318 |
| 2005/0086606 A1 | 4/2005 | Blennerhassett et al. | |

* cited by examiner

*Primary Examiner* — Insun Kang
(74) *Attorney, Agent, or Firm* — Steven M. Greenberg, Esq.; Carey Rodriguez Greenberg Paul LLP

(57) ABSTRACT

Embodiments of the present invention address deficiencies of the art in respect to scenario testing of an application under test and provide a method, system and computer program product for enhanced scenario testing. In one embodiment of the invention, a scenario testing data processing system can include an action recorder configured to activate each of recording and playback sessions in an application user interface. The system also can include an application communicatively coupled to the action recorder and the content browser. The application can include one or more controllers, each controller corresponding to one of the sessions. Finally, the system can include an action engine disposed in each of the controllers, each action engine including program code enabled both to create and execute actions based upon requests received in a recording session for interactions in the application user interface, and also to create and execute actions based upon action descriptors in a playback file identified during a playback session in the application user interface.

20 Claims, 3 Drawing Sheets

ENHANCED SCENARIO TESTING OF AN APPLICATION UNDER TEST

BACKGROUND OF THE INVENTION

1. Field of the Invention

The present invention relates to the field of software functional testing and more particularly to recording and playback of application interactions for application testing.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

Web applications, like conventional GUI driven applications, benefit from software functional testing. Most Web applications consist of pages which a user can load using a Web browser to display information or to gather user inputs. Inputs can be submitted to the Web application to accomplish some tasks for the user. Thus, to functionally test a Web application can require the manual entry of input into the fields of a Web form. However, where one or more tasks in a Web application require massive user inputs and many mouse-clicks, repetitive test scenarios can become cumbersome, time consuming and error prone.

The ability to record and play back test scenarios in functionally testing a Web application provides several advantages. First, recording and playing back test scenarios for testing a Web application obviates the need to manually script test scenarios. Second, test scenarios can be automated so as to not require user interaction to increase consistency, accuracy and efficiency. Finally, automated test cases can run more frequently to ensure the ultimate quality of an application under test.

There are tools available today that automate the testing of Web applications; however, conventional testing tools which automate the testing of Web applications suffer from several deficiencies. First, these tools facilitate test automation by capturing data sent from the Web browser to the Web application. Resending the data resembles a repetitive task. Yet, this approach fails in cases where data is session dependent. Second, these tools are not an integral part of the Web application itself. Consequently, users must install additional computer program logic in order to automate a scenario.

As a third deficiency, conventional tools do not allow a user to play back scenarios in a current Web browser session. Rather, conventional tools require the creation and use of a separate Web browser session to play back a scenario. As a fourth deficiency, conventional tools require users to write scenarios manually. Finally, most of the commercially available testing tools capture mouse and keyboard activities instead of the actual data processed in consequence of the mouse and keyboard activities. Thus, these tools can be heavily dependent on the user interface of the application. This, in turn, limits the ability to use the mouse and keyboard during play back and defeats the portability of the scenario across different Web browsers and platforms. Any slight changes to the user interface can render the scenario useless.

BRIEF SUMMARY OF THE INVENTION

Embodiments of the present invention address deficiencies of the art in respect to scenario testing of an application under test and provide a novel and non-obvious method, system and computer program product for enhanced scenario testing. In one embodiment of the invention, a scenario testing data processing system can include an action recorder configured to activate each of recording and playback sessions in an application user interface. The system also can include an application communicatively coupled to the action recorder and the application user interface. The application can include one or more controllers, each controller corresponding to one of the sessions. Finally, the system can include an action engine disposed in each of the controllers, each action engine including program code enabled both to create and execute actions based upon requests received in a recording session for interactions in the application user interface, and also to create and execute actions based upon action descriptors in a playback file identified during a playback session in the application user interface.

In one aspect of the embodiment, the actions each can implement an action interface including a method for populating the action with data, a method returning a list of transformers both to normalize session dependent data for the action, and also to de-normalize normalized data for the action, and a method for executing the action. The actions also can include a set of transformers for normalizing session dependent data and de-normalizing normalized data. In another aspect of the embodiment, each action engine in a corresponding one of the controllers further can include a list of action descriptors, each of the descriptors including an action identifier and normalized data for an action associated with the action identifier. In this way, the program code can be further enabled to produce a playback file including the action descriptors.

In another embodiment, a scenario testing method for an application under test can include identifying a set of actions within a corresponding set of requests received in the application under test and produced from interactions in an interface to the application under test. The method also can include performing the actions in the application under test and returning results from the actions to the interface. The method yet further can include recording the actions in a playback file. Finally, the method can include playing back the actions in the playback file to perform the recorded actions in the application under test.

The step of identifying a set of actions within a corresponding set of requests received in the application under test and produced from interactions in an interface to the application under test can include extracting requested actions from the requests, creating the set of action instances from an action interface for the requested actions, and populating the set of actions instances with data extracted from the requests. The step of populating the set of actions instances with data extracted from the requests can include populating the set of actions instances with data normalized from data extracted from the requests. Finally, the step of playing back the actions in the playback file to perform the recorded actions in the application under test, can include playing back the actions in the playback file using de-normalized forms of normalized data in the action instances.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for enhanced software testing through recording and playing back of interactions with an application. In accordance with an embodiment of the present invention, interactions with an application can be received from an interacting application user interface and associated with the session established with the application user interface. The interactions can be recorded as actions which conform to a pre-established action interface. Moreover, data within the actions can be normalized to render the data session neutral. Thereafter, the actions can be executed producing results which can be returned to the interacting client. Optionally, the actions can be recorded for subsequent retrieval and playback.

During playback, a list of actions can be retrieved for processing and action instances can be created for each listed action. Data for each action can be de-normalized for a current session with the application user interface. As each action is executed, the result can be forwarded to the application user interface for rendering. Likewise, error handling logic can process errors resulting from the execution of the actions. Notably, by virtue of the recording and playback methodology of the present invention, the request resulting from user interface interactions for the desired action can be recorded rather than mouse and keyboard movements alone. As such, a recorded test scenario can be played back in a singular session without regard to interference through the concurrent use of a mouse or keyboard.

Figure 1:
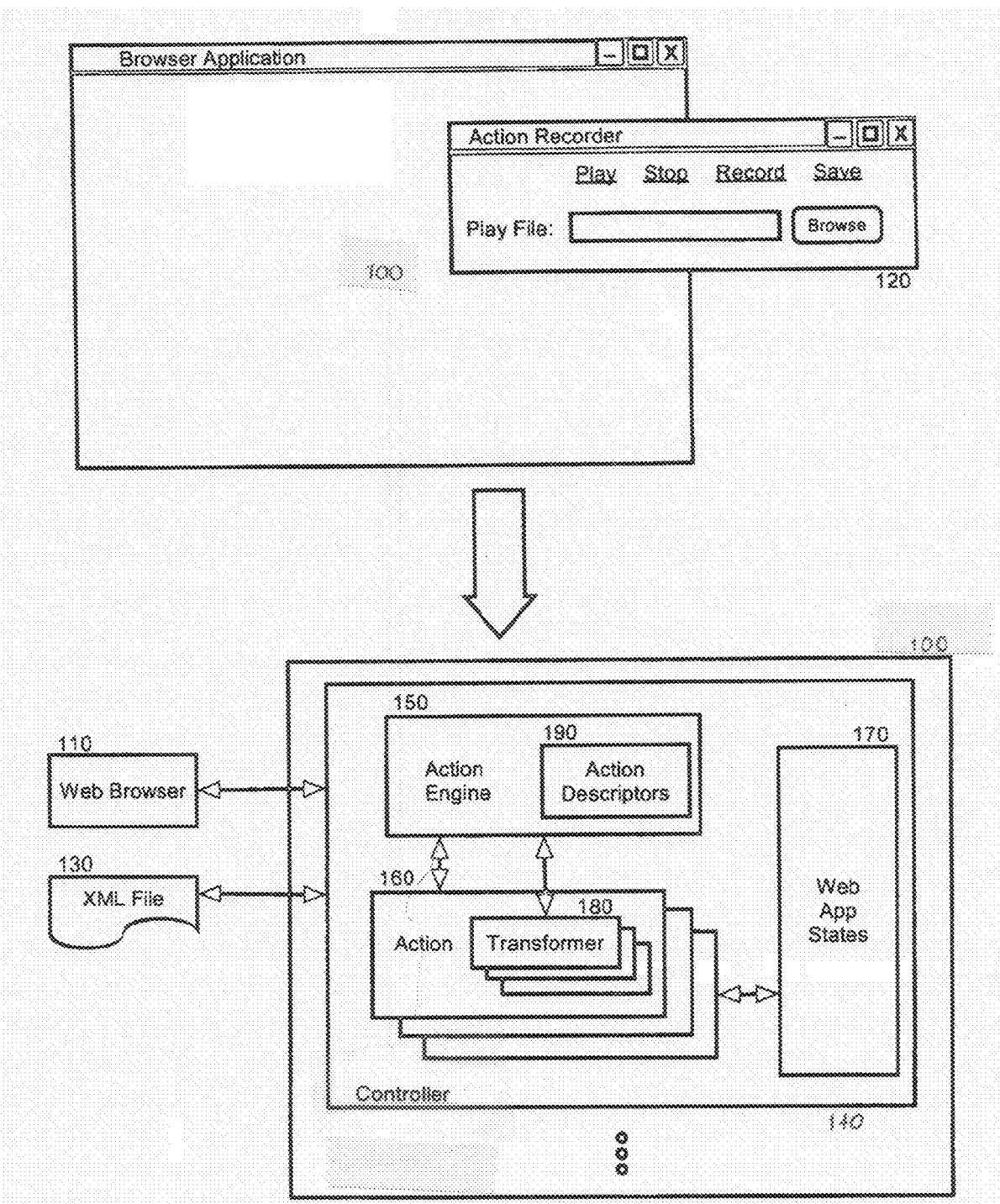
FIG. 1 is a dual pictorial-schematic illustration of a system configured for enhanced software testing through recording and playing back of interactions with an application.

In more particular illustration, FIG. 1 is a dual pictorial-schematic illustration of a system configured for enhanced software testing through recording and playing back of interactions with an application. Referring initially to the pictorial aspect of FIG. 1, an action recorder 120 can be associated with a browser based application 110 having an application user interface which can be rendered in a content browser. When inactive, the browser based application 110 can interact with a Web application source without incurring overhead through the operation of the action recorder 120. By comparison, when activated the action recorder 120 can facilitate the recording and playback of user interactions with the browser application 110 for scenario based testing of the browser application 110.

Specifically, when it is desired to record user interactions with the browser application 110 to produce a test scenario, the record directive can be selected in the action recorder 120. Responsive to the selection of the record directive, actions produced by user interactions in the browser application 110 can be recorded. When the recording session has completed, the selection of the save directive can result in the persistence of a playback script incorporating the recorded actions. As such, the selection of the play directive in the action recorder 120 can result in the playing back of the persisted test scenario in the browser application 110.

Referring now to the schematic portion of FIG. 1, a system configured for enhanced testing through recording and playback of interactions can include a set of controllers 140 in a Web application 100. Each controller 140 can enjoy a one-to-one correspondence with a session between the Web application 100 and a client Web browser 110. Each controller 140 can include a set of actions 160 produced through interactions in the Web browser 110. Each controller 140 further can include an action engine 150 for processing and executing the actions 160, and further for persisting the action descriptors 190 in a playback file 130, such as a file formatted according to the extensible markup language (XML). A list of action descriptors 190 can be maintained in the action engine 150 to track the actions 160 in the controller 140. Finally, the controller can include a data store of application states 170 for a Web application under test.

In operation, the recording phase of the action recorder 120 can include the receipt of a request from the browser application 110 in the Web application 100. The request can include, for example, a hypertext transfer protocol (HTTP) request. The session identifier for the request can be determined and a corresponding controller 140 can be identified. In this regard, each session can include a singular controller 140 in the Web application 100. To the extent that a controller does not exist for a determined session with the Web browser 110, a controller 140 can be created for the determined session.

Once received in the controller 140, the request can be parsed and an included action can be extracted from the request as part of the payload of the request. Action parameters and data also can be extracted from the request. Subsequently, the controller 140 can create an action instance 160 for the requested action. Additionally, the parameters and data can be normalized using a selected transformer 180 into a session neutral form and stored in the created action instance. For instance, session specific data for an action instance 160 can be converted to session independent data. During playback, the session independent data can be converted back to session dependent data, albeit for the playback session rather than the record session.

A list of action descriptors 190 also can be maintained in the action engine 150 during the recording process. The action descriptors 190 can include both identifiers for the actions 160, and also the normalized data for corresponding actions 160 for the recording session. Once the action instance 160 has been created and a corresponding entry written to the action descriptors 190, the action engine 150 can execute the action in the Web, application 100. The execution can result in a change in state for the Web application which can be persisted in the data store of Web application states 170. Any resulting output can be returned to the Web browser 110 for rendering in the Web browser. Finally, if requested, the action descriptors 190 can be written to a playback file 130 for subsequent use in a playback session. An exemplary playback file listing follows:

```xml
<?xml version="1.0" encoding="UTF-8"?>
<scenario>
    <transaction>
        <action attempts="1"
        id="com.ibm.etools.websvc.explorer.actions.cmd1>
            <property name="propname1-1">
                <value>val1-1</value>
            </property>
            ...
            <property name="propname1-N">
                <value>val1-N</value>
            </property>
        </action>
        ...
        <action attempts="1"
        id="com.ibm.etools.websvc.explorer.actions.cmdN>
            <property name="propnameN-1">
                <value>valN-1</value>
            </property>
            ...
            <property name="propnameN-N">
                <value>valN-N</value>
            </property>
        </action>
    </transaction>
</scenario>
```

During playback, the playback file 130 can be read in to the Web application 100 and a controller 140 can be determined for the session indicated by the playback request. The selected controller 140 can parse the playback file 130 to identify a list of action descriptors 190. Subsequently, each action instance 160 corresponding to the action descriptors 190 can be created and executed in the Web application 100. During the execution phase, session independent data can be transformed to session dependent data where necessary utilizing a suitable transformer 180. As before, any changes to the state of the Web application 100 can be persisted in the data store of Web application states 170. Also, output produced in the Web application 100 as a result of the actions 160 can be provided to the Web browser 110 for rendering therein.

Figure 2:
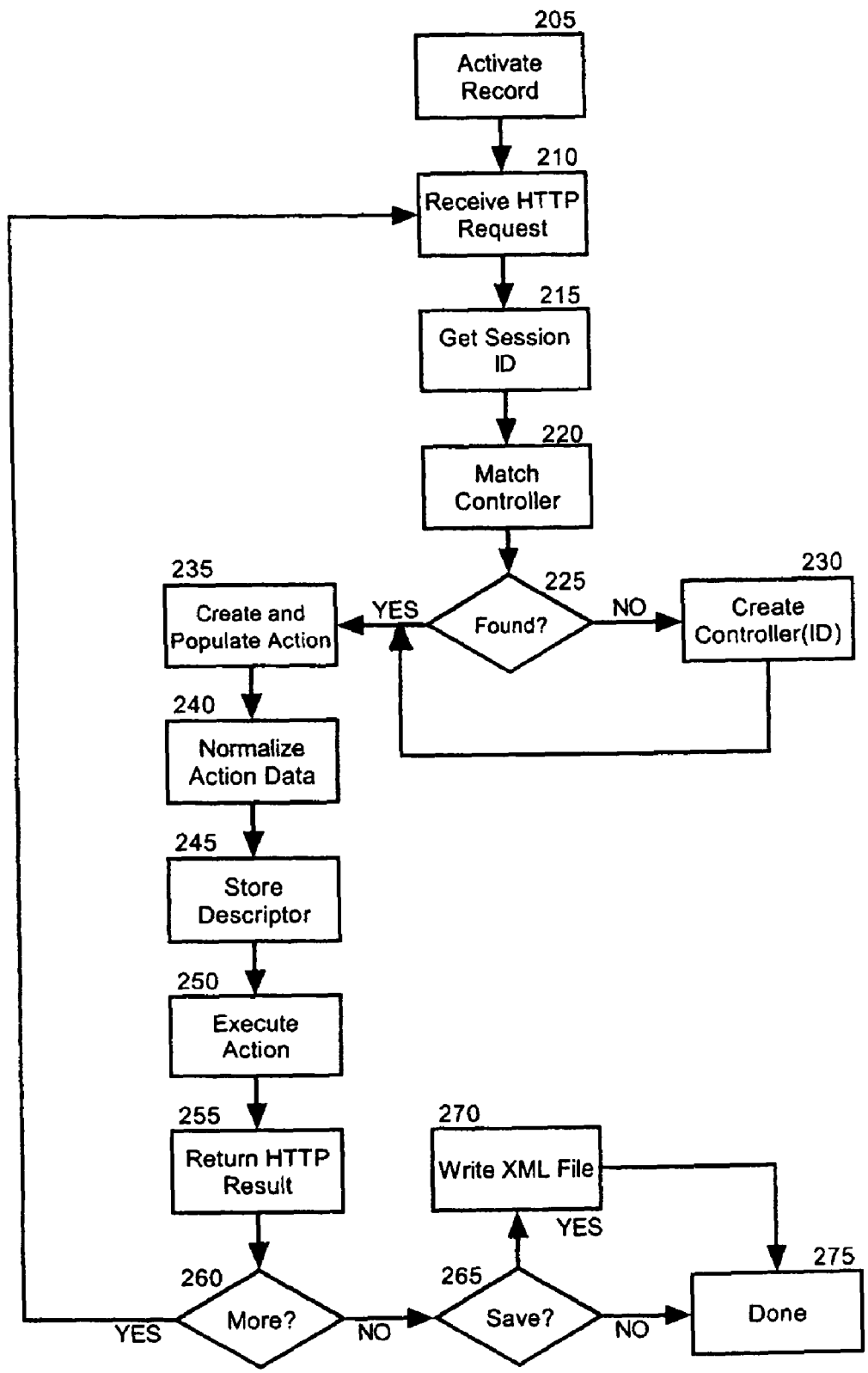
FIG. 2 is a flow chart illustrating a process for enhanced software testing through recording of interactions with an application; and, FIG. 3 is a flow chart illustrating a process for enhanced software testing through playing back of recorded interactions with an application.
Figure 3:
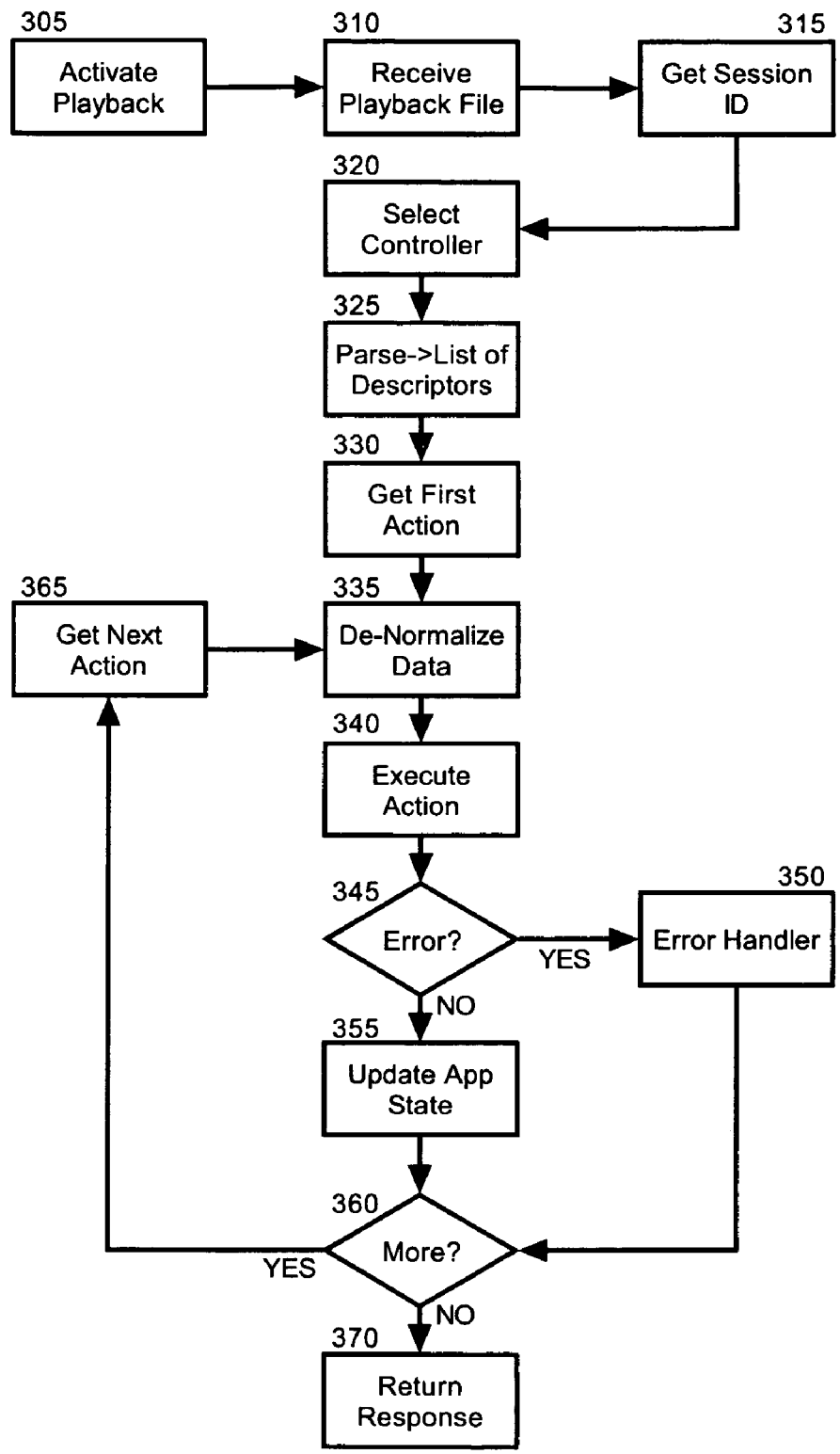

In further illustration, FIGS. 2 and 3, taken together, are a flow chart illustrating a process for enhanced software testing through recording and playback of interactions with an application. First considering the recording of user interactions in FIG. 2, in block 205, a record feature can be activated for an application user interface accessing the application, and thereafter, in block 210, a request can be received resulting from a user interaction with the application. In block 215, a session identifier for the session established with between the application user interface and application can be retrieved from the request.

In block 220, the session identifier can be matched to an existing controller. In decision block 225 if an existing controller cannot be identified for the session identifier, in block 230 a controller can be created for the session identifier. In either circumstance, however, in block 235 the requested action within the request can be extracted and an action instance can be created and populated with data for the requested action. The action instance as well as the requested action can conform to an action interface can include a method for populating the action with data, a method returning a list of transformers both to normalize session dependent data for the action, and also to de-normalize normalized data for the action, and a method for executing the action.

In block 240, data for the action requiring normalization can be normalized using a selected transformer provided by the action instance. Subsequently, in block 245, an action descriptor can be created and stored for the action. The action descriptor can include an action identifier and the normalized data for the action. Thereafter, in block 250 the action can be executed in the application and in block 255 a result from the executed action can be returned to the application user interface for rendering. The foregoing process can repeat for each desired interaction in decision block 260 until such time that the record feature is de-activated. Once de-activated, in decision block 265 it can be determined whether to persist the recorded set of actions in a persistent playback file. If so, in block 270 the action descriptors can be written to a playback file and the process can end in block 275.

Referring now to FIG. 3, a flow chart is shown which illustrates a process for enhanced software testing through playing back of recorded interactions with an application. Beginning in block 305, a playback session of a test scenario can be activated and, in block 310 a playback file can be received for processing. In block 315, a session identifier can be retrieved and in block 320, a controller can be selected to process the playback file. In block 325, the playback file can be parsed to produce a list of action descriptors which can include both identifiers for different actions in addition to normalized data for the different actions. In block 330, a first action can retrieved for processing from the list and in block 335, the data for the retrieved action can be de-normalized to comport with the session established for playback. Subsequently, the action can be created and executed in block 340.

In decision block 345, it can be determined whether an error has occurred in consequence of the execution of the action. If so, in block 350, an error handling routine can process the error. The error handling routine can include the termination of the execution of all actions, termination of all actions sharing a common transaction with the action giving rise to the error, retrying the action, or proceeding with the next action as shown in FIG. 3. In decision block 345 if it is determined that no error has occurred, the process can continue through block 355.

In block 355, the state of the application can be updated in consequence of the execution of the action. Subsequently, in decision block 355, if more action descriptors remain to be processed, in block 365, a next action can be retrieved for processing and the process can repeat through block 335. When no further action descriptors remain to be processed in the playback file, in block 370 a response can be returned to the application user interface and the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A scenario testing data processing system having a processor comprising:
    an action recorder configured to activate each of recording and playback sessions in a content browser;
    an application communicatively coupled to said action recorder and said content browser, said application comprising a plurality of controllers, each controller corresponding to one of said sessions; and,
    an action engine disposed in each of said controllers, each said action engine comprising program code enabled both to create and execute actions based upon requests received in a recording session for interactions in said content browser, and also to create and execute actions based upon action descriptors in a playback file identified during a playback session in said content browser.

2. The data processing system of claim 1, wherein said action recorder comprises a playback directive, a record directive, and a save directive.

3. The data processing system of claim 1, wherein said application is a Web application.

4. The data processing system of claim 1, further comprising a data store of application states disposed in each of said controllers.

5. The data processing system of claim 1, wherein said actions each implement an action interface comprising a method for populating said action with data, a method returning a list of transformers both to normalize session dependent data for said action, and also to de-normalize normalized data for said action, and a method for executing said action.

6. The data processing system of claim 1, wherein said actions each comprise a set of transformers for normalizing session dependent data and de-normalizing normalized data.

7. The data processing system of claim 1, wherein each action engine in a corresponding one of said controllers further comprises a list of action descriptors, each of said descriptors comprising an action identifier and normalized data for an action associated with said action identifier.

8. The data processing system of claim 1, wherein said program code is further enabled to produce a playback file comprising said action descriptors.

9. The data processing system of claim 8, wherein said playback file is formatted according to the extensible markup language (XML).

10. The data processing system of claim 1, wherein said requests are hypertext transfer protocol (HTTP) requests.

11. A scenario testing method for an application under test comprising:
    identifying actions within a corresponding set of requests received in said application under test and produced from interactions in an interface to the application under test;
    performing said actions in the application under test and returning results from said actions to said interface;
    recording said actions in a playback file in a recording session; and
    playing back said actions in said playback file to perform said recorded actions in the application under test in a playback session, wherein
    said application comprising a plurality of controllers, each controller corresponding to one of said sessions, said controller both
        creating and executing actions based upon requests received in the recording session for interactions in said content browser, and
        creating and executing actions based upon action descriptors in the playback file identified during the playback session in said content browser.

12. The scenario testing method of claim 11, wherein said identifying comprises:
    extracting requested actions from said requests;
    creating said set of action instances from an action interface for said requested actions; and,
    populating said set of action instances with data extracted from said requests.

13. The scenario testing method of claim 11, further comprising:
    determining a session for said interface and the application under test; and,
    performing said performing and recording in a controller associated with said determined session.

14. The scenario testing method of claim 12, wherein said set of action instances are populated with a data normalized from data extracted from said requests.

15. The scenario testing method of claim 14, wherein said actions in said playback file are played back using de-normalized forms of normalized data in said action instances.

16. A computer program product comprising a computer usable storage medium having computer usable program code for scenario testing an application under test stored thereon, said computer program product causing a data processing hardware system to perform the steps of:
    identifying actions within a corresponding set of requests received in said application under test and produced from interactions in an interface to the application under test;
    performing said actions in the application under test and returning results from said actions to said interface;
    recording said actions in a playback file in a recording session; and
    playing back said actions in said playback file to perform said recorded actions in the application under test in a playback session, wherein
    said application comprising a plurality of controllers, each controller corresponding to one of said sessions, said controller both
        creating and executing actions based upon requests received in the recording session for interactions in said content browser, and creating and executing actions based upon action descriptors in the playback file identified during the playback session in said content browser.

17. The computer program product of claim 16, wherein said identifying comprises:

extracting requested actions from said requests;

creating a set of action instances from an action interface for said requested actions; and, populating said set of action instances with data extracted from said requests.

18. The computer program product of claim 16, further comprising:

determining a session for said interface and the application under test; and, performing said performing and recording in a controller associated with said determined session.

19. The computer program product of claim 17, wherein said set of action instances is populated with a data normalized from data extracted from said requests.

20. The computer program product of claim 19, wherein said actions in said playback file are played back using de-normalized forms of normalized data in said action instances.

* * * * *